United States Patent [19]

Staiert

[11] Patent Number: 4,516,956
[45] Date of Patent: May 14, 1985

[54] WELD JOINT STRUCTURE FOR AN ELASTOMERIC FLEXIBLE COUPLING

[75] Inventor: Richard W. Staiert, Geneseo, Ill.

[73] Assignee: Caterpillar Tractor Co., Peoria, Ill.

[21] Appl. No.: 533,476

[22] Filed: Sep. 19, 1983

[51] Int. Cl.³ .................... F16D 3/26; F16D 3/14
[52] U.S. Cl. ........................ 464/89; 464/87; 464/106
[58] Field of Search ............ 464/89, 91, 87, 180, 464/182, 147, 150, 51, 106; 403/225, 228, 220, 221, 335

[56] References Cited

U.S. PATENT DOCUMENTS

| | | | |
|---|---|---|---|
| 2,937,514 | 5/1960 | Van Ranst | 464/30 |
| 3,263,451 | 8/1966 | Reimer | 464/91 X |
| 3,296,828 | 1/1967 | Stübner et al. | 464/89 |
| 3,320,771 | 5/1967 | Roethlisberger et al. | 464/91 |
| 3,727,431 | 4/1973 | Yokel | 464/17 |
| 4,236,737 | 12/1980 | Herbert et al. | 464/89 X |
| 4,406,640 | 9/1983 | Franklin et al. | 464/89 X |

OTHER PUBLICATIONS

Lord Industrial Products Publication, published 8/82, pp. 1-10, "Dynaflex Flexible Couplings."

Primary Examiner—John Petrakes
Assistant Examiner—Leo J. Peters
Attorney, Agent, or Firm—Charles E. Lanchantin, Jr.

[57] ABSTRACT

A weld joint structure (12) is provided for a flexible coupling (10) having an inner hub (38), an outer cup (40), and an elastomeric ring (42) for torsional vibration protection of a drive train (14). The outer cup (40) defines an integral radially inwardly disposed tubular portion (64) having an internal seat (68), and an adapter member (70) of different ferrous material composition has an external seat (74) that is connected to the cup (40) by an annular weld joint (78). Preferably, the cup (40) abuts a shoulder (76) on the adapter member (70) where the weld joint is located, and a reverse bend transition portion (62) on the cup (40) functions with the tubular portion (64) to minimize bending loads on the weld joint.

9 Claims, 1 Drawing Figure

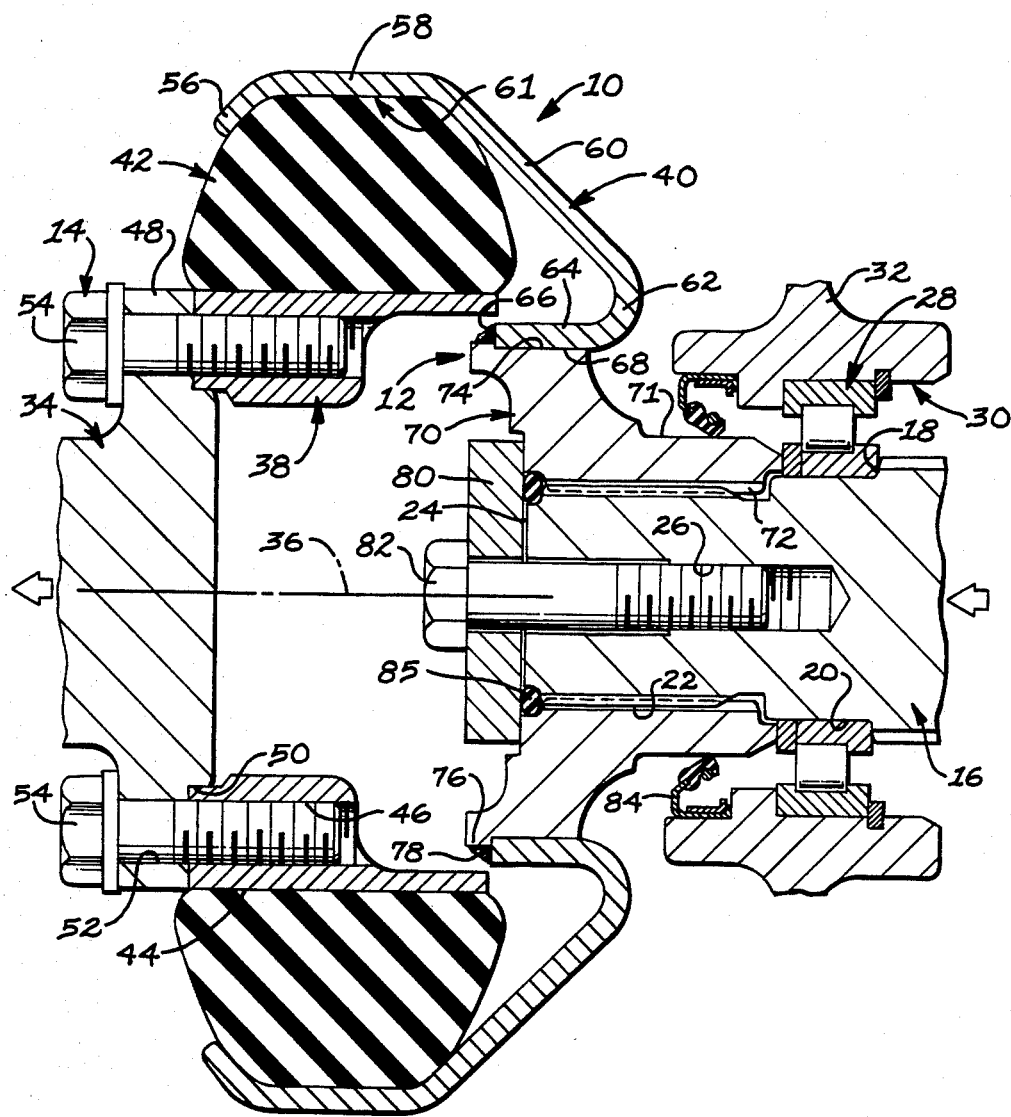

WELD JOINT STRUCTURE FOR AN ELASTOMERIC FLEXIBLE COUPLING

DESCRIPTION

1. Technical Field

This invention relates generally to an elastomeric flexible coupling for isolating torsional vibration in a drive line, and more particularly to the construction of such a coupling for connecting it to a pair of generally aligned shafts.

2. Background Art

Flexible couplings are known for transmitting torque from an engine to a drive line using a natural rubber ring interposed between a radially inner hub and a radially outer cup. The rubber ring is connected to the cylindrical periphery of the inner hub, and is seated within an annular trough formed in the cup. During the manufacture thereof the assembly of the inner hub and rubber ring is urged axially while compressing the ring in order to pass the ring within the edge of a lip formed in the cup. The ring then expands fully into seated engagement with the trough while retaining a preselected degree of compression.

These flexible couplings effectively isolate torsional vibrations associated with numerous vehicular and industrial driveline systems through a shearing action of the elastomeric of rubber material of the ring. Shock loads are attenuated by deflection of the ring material, and the flexibility thereof allows for a considered amount of accommodation to misalignment. Such flexible couplings are manufactured, for example, by Lord Corporation of Erie, Pa. and are referred to as Dynaflex Flexible Couplings—the term Dynaflex being a registered Trademark of that corporation.

Normally, the outer cup of those couplings is releasably connected to a relatively larger diameter input member such as an engine flywheel element through a plurality of bolts which extend through holes in the outer peripheral flange of the cup and into screwthreaded engagement with the input member. The inner hub can be releasably connected to a shaft through aligned and threaded passages using another plurality of bolts. However, the structural connection becomes much more complex when the outer cup is to be connected to a radially inner shaft.

Since the outer cup is typically formed into its annular shape by deep drawing and/or spinning it is of relatively uniform thickness, for example about 5 mm. It is therefor impractical to extend the formed cup radially inwardly to be connected to a shaft because the usual low carbon steel material thereof cannot be provided with an acceptable internal spline. Consequently, an intermediate and relatively tough adapter member is required to releasably connect the outer cup to the shaft. But, if the cup is connected to the adapter member through an outer peripheral flange formed integrally with the cup, an excessively large diameter bolt joint is needed and the adapter member becomes too large and heavy. On the other hand, if the cup is formed with a radially inwardly extending portion it is not convenient from either a servicing standpoint or space requirements to use a small diameter bolt circle.

While an annular weld joint can be used to connect the cup to an adapter member, it is to be appreciated that it is a function of the flexible coupling to operate with some misalignment. Under these conditions, reverse bending of the cup material can occur of a magnitude sufficient to induce fatigue cracking of the weld joint if the cup and adapter member are improperly constructed.

Accordingly, what is needed is a simple and effective weld joint structure of an outer cup and an inner adapter member in order to permit the structure to be releasably connected to a shaft. The structure should preferably be of light weight for easy serviceability and reduced balance problems, be of a space-conserving design, and be such configuration as to minimize the effect of bending loads on the weld joint.

DISCLOSURE OF THE INVENTION

The present invention is directed to overcoming one or more of the above problems.

In one aspect of the invention there is provided a weld joint structure for an elastomeric flexible coupling of the type having an inner hub, an outer cup, and elastomeric ring means located therebetween for torsional vibration and shock protection of a drive line. Advantageously, the cup is formed of a plurality of serially connected surfaces of revolution including a peripheral portion, a radially inwardly extending wall portion, a reverse bend transition portion, and a tubular portion defining an internal annular seat, and an adapter member having an external annular seat is connected thereto by weld joint means with the seats in supporting and facing relation.

In another aspect of the invention an elastomeric flexible coupling has an inner hub, an outer cup, an elastomeric ring connected therebetween, and a weld joint structure is provided by the cup being formed into a peripheral portion, a radially inwardly and generally conical wall portion, a reverse bend transition portion, and an inner tubular portion defining a bore and an inner end, and by an adapter member defining an external surface in facing engagement with the bore, such as to permit an annular weld joint to be utilized at the inner end of the cup to connect the cup to the adapter member.

BRIEF DESCRIPTION OF THE DRAWING

The sole FIGURE illustrated is a diagrammatic, elevational sectional view through the central axis of a drive line incorporating the elastomeric flexible coupling and weld joint structure of the present invention.

BEST MODE FOR CARRYING OUT THE INVENTION

An exemplary embodiment of an elastomeric flexible coupling 10 incorporating the weld joint structure 12 of the present invention is illustrated in the drawing in conjunction with a vehicle drive line 14 of the type used in an earthmoving tractor. The drive line shown includes an input shaft 16 having an outwardly facing shoulder 18, a cylindrical bearing seat 20 located outwardly of the shoulder, an external spline 22 disposed outwardly of the seat, a distal end surface 24, and a partially threaded bore 26 opening on the end surface. A roller bearing assembly 28 rotatably supports the input shaft within an opening 30 in a stationary housing 32. The input shaft is driven at engine speed, for example up to about 2,000 rpm. The flexible coupling 10 is driven by the input shaft 16, and in turn drives an output shaft 34 arranged generally coaxially of the input shaft along a central axis 36.

More particularly, the flexible coupling 10 includes an inner hub 38, an outer cup 40 and elastomeric ring means 42 contained between the hub and cup for reducing the magnitude and severity of torsional fluctuations being transmitted through the drive line 14. In the instant example the ring means is an annular ring of natural rubber material having a generally trapezoidal cross section when in the free state, which is compressibly contained between the hub and cup in a somwhat outwardly bulging or convex end surface shape in cross section.

The inner hub 38, which is preferably of a ductile iron material, has an external cylindrical seat 44 and a plurality of threaded bores 46 therethrough parallel to the central axis 36. The output shaft 34 has an end flange 48 defining a cylindrical piloting end face 50 and a plurality of bores 52 therethrough which are alignable with the threaded bores 46. A plurality of fasteners or bolts 54 extend through the bores and are screwthreadably received in the threaded bores of the hub to releasably mount the piloting end face of the shaft within the hub.

On the other hand, the cup 40 is preferably formed of a plurality of serially connected surfaces of revolution from a low carbon steel material having good weldability. For example, a material having 0.15 to 0.25 Wt.% carbon and 0.30 to 0.60 Wt.% manganese and other ingredients similar to ASTM A513MT1020 can be used, although the carbon content could be reduced to about 0.10 Wt.% or even a little less. As shown in the drawing, the cup has a radially inwardly and axially outwardly extending lip 56, a cylindrical peripheral portion 58, and a radially inwardly and axially outwardly extending wall or collet 60 which collectively define a trapezoidal trough in cross section as indicated generally by the reference number 61 for receiving the annular ring 42. Thus, the lip and collet are substantially opposed conically shaped walls which contain a portion of the end surfaces of the annular ring. The collet 60 extends radially inwardly to a reverse bend transition portion 62 where it is further integrally connected to a tubular portion 64 having an inner end 66.

Advantageously, the weld joint structure 12 is defined in part by the tubular portion 64 and an internal cylindrical bore or seat 68 formed therein, and in part by an adapter member or mounting flange 70 disposed therein. Specifically, the adapter member is preferably made from a nitriding grade of an alloy steel which is economically available in the form of billets, bars or forgings. For example, a material having 0.37 to 0.44 Wt.% carbon and 0.65 to 1.10 Wt.% manganese comparable to SAE 41L40H can be used to provide a Rockwell C hardness range from about 35-55. This gives a hardness level appreciably greater than the approximate Rockwell B 75 hardness value of the cup 40 and which is of particular importance in connection with the service life of a cylindrical seal engaging surface 71 and an internal spline 72 formed thereon. Adapter member 70 also defines an external cylindrical surface or seat 74 and an annular shoulder 76 at one end thereof, such as to receive the tubular portion 64 of the cup thereon with the inner end 66 abuttingly disposed axially against the shoulder. The remainder of the weld joint structure is defined by an annular fillet weld joint 78 of ferrous based material located at the intersection of the shoulders periphery and the inner end of the cup.

An end end plate 80 can be used to positively retain the adapter member 70 on the distal end of the input shaft 16 as by one or more fasteners or bolts 82 screwthreadably received in the corresponding bores 26.

INDUSTRIAL APPLICABILITY

In the manufacturing phase the fully formed outer cup 40 is preferably mounted on the internally splined adapter member 70 by use of a preselected interference or press fit of the surfaces 68,74. For example, a diametral press fit of from 0.076 to 0.178 mm can be used. The annular weld joint 78 is then applied to positively join the two members together at a location removed from the transition portion 62 by the press fit so that bending loads are effectively isolated therefrom. The annular elastomeric ring 42 is preferably formed in place on the inner hub 38, although it can also be adhesively bonded thereto, and is subsequently radially compressed while moving it axially inwardly into the cup over the edge of lip 56 and into full engagement with the trough 61. This substantially completes the assembly of the flexible coupling 10, which can then be installed in the drive line 14.

The flexible coupling 10 is connectable to the distal end of the input shaft 16 by sliding the adapter member 70 axially inwardly with the splines 22,72 in intermeshing engagement. The bolt or bolts 82 are axially accessible from within the hub 38 or from the left when viewing the drawing and are screwthreadably engaged in the input shaft to urge the end plate 80 against the adapter member, and to urge the adapter member loadably against the inner race of the bearing assembly 28 so that it is in positive engagement with the shoulder 18. Preferably, a slight axial clearance will exist between the end plate and the end surface 24 of the input shaft when the bolts are tightened to a preselected torque level. Under these conditions a lip type seal 84 makes sealing engagement with the cylindrical surface 71 of the adapter member and an O-ring seal 85 abuts the end plate to seal off the outer end of the splines 22,72 in order to contain lubricating fluid within the housing 32.

The piloting end face 50 of the output shaft 34 can then be inserted axially within the inner hub 38 and the bolts 54 also screwthreadably engaged from the left when viewing the drawing into the bores 46 to couple the output shaft to the flexible coupling 10.

From the foregoing description it can be appreciated that the low cost weld joint structure 12 conserves space and minimizes weight, while still permitting easy assembly and serviceability of the flexible coupling 10. Moreover, the adapter member 70 can be readily machined from a small forging or bar stock using high production rate equipment. The weld joint structure 12 further has a construction sufficient for substantially eliminating bending loads on the weld joint 78 due to misalignment of the input and output shafts. Such bending loads would be present in the inner end of the cup was otherwise extended directly radially inwardly and then welded to an adapter member—rather than having the reverse bend transition portion 62 and tubular portion 64 of the weld joint structure 12. Still further, the ferrous materials of the cup and adapter member can be specifically tailored to accommodate the desired manufacturing and service life conditions of these two different parts.

Under certain higher torque loading conditions it may be desirable to provide additional weld joint capacity in the weld joint structure 12, although it can be appreciated that if the cross sectional area of the weld joint 78 were equal to the cross sectional area of the cup 40, their load transmitting capabilities would be substantially equivalent. In order to compensate for less than a perfect annular weld joint 78 the left or inner end of the tubular portion 64 could be provided with notches or holes and additional weld joint material deposited therein, although not illustrated in the drawing, to better mechanically interlock the material of the cup with the material of the adapter member 70.

Other aspects, objects and advantages of this invention can be obtained by a study of the drawing, the disclosure and the appended claims.

I claim:

1. In an elastomeric flexible coupling for connecting first and second shafts and being of the type having an inner hub connectable to the first shaft, an outer cup, and elastomeric ring means therebetween for torsional vibration and shock protection of a drive line, a weld joint structure comprising:

the cup being formed of a plurality of serially connected surfaces of revolution including a peripheral portion, a radially inwardly extending wall portion, a reverse bend transition portion, and a radially inner tubular portion extending from said reverse bend portion toward said peripheral portion defining an internal annular seat;

an adapter member connectable to the second shaft and defining an external annular seat; and weld joint means for connecting the tubular portion of the cup to the adapter member with the seats in supporting and facing relation.

2. The weld joint structure of claim 1 wherein the seats are defined by cylindrical surfaces.

3. The weld joint structure of claim 2 wherein the adapter member has a shoulder thereon, the tubular portion of the cup abuts the shoulder, and the weld joint means includes an annular weld joint located peripherally adjacent the shoulder.

4. In an elastomeric flexible coupling of the type having an inner hub, an outer cup, and an elastomeric ring connected therebetween for torsional vibration and shock protection of a drive line, a weld joint structure comprising:

the cup being formed serially into a peripheral portion, a radially inwardly extending and generally conical wall portion, a reverse bend transition portion and an inner tubular portion extending from said reverse bend portion toward said peripheral portion defining an internal bore and an inner end;

an adapter member having a hardness greater than that of the cup and defining an external surface; and a weld joint connecting the inner end of the cup to the adapter member with the external surface disposed facingly against the bore, the construction of the cup including the transition portion serving to minimize the effect of bending loads on the weld joint.

5. The weld joint structure of claim 4 wherein the adapter member has a shoulder thereon and the inner end of the cup abuts the shoulder.

6. The weld joint structure of claim 4 wherein the drive line includes a shaft with an external spline thereon, and the adapter member defines an internal spline for mating engagement with the external spline.

7. An elastomeric flexible coupling for connecting first and second shafts, comprising:

an inner hub connectable to the first shaft;

an elastomeric ring mounted externally on the hub;

an outer cup defining an annular trough containing the elastomeric ring, an inwardly extending conical wall portion, a reverse bend transition portion, and a radially inner tubular portion extending from said reverse bend portion toward said peripheral portion, and wall means for integrally connecting the trough and tubular portion;

an adapter member having a peripheral seat in facing engagement with the tubular portion; and a weld joint connecting the tubular portion of the cup to the adapter member, the construction of the cup serving to minimize bending loads on the weld joint as a result of misalignment between the first and second shafts.

8. The elastomeric flexible coupling of claim 7 wherein the adapter member has a shoulder at one end of the seat and the tubular portion of the cup substantially abuts the shoulder.

9. The elastomeric flexible coupling of claim 8 wherein the peripheral seat of the adapter member is a cylindrical external surface.

* * * * *